US009953221B2

(12) United States Patent
Chen et al.

(10) Patent No.: US 9,953,221 B2
(45) Date of Patent: Apr. 24, 2018

(54) MULTIMEDIA PRESENTATION METHOD AND APPARATUS

(71) Applicant: Xiaomi Inc., Beijing (CN)

(72) Inventors: Zhijun Chen, Beijing (CN); Wendi Hou, Beijing (CN); Fei Long, Beijing (CN)

(73) Assignee: Xiaomi Inc., Beijing (CN)

( * ) Notice: Subject to any disclaimer, the term of this patent is extended or adjusted under 35 U.S.C. 154(b) by 73 days.

(21) Appl. No.: 15/196,766

(22) Filed: Jun. 29, 2016

(65) Prior Publication Data

US 2017/0154220 A1 Jun. 1, 2017

(30) Foreign Application Priority Data

Nov. 26, 2015 (CN) .......................... 2015 1 0845744

(51) Int. Cl.
G06K 9/00 (2006.01)
G06F 3/16 (2006.01)
G06F 3/0484 (2013.01)
G06F 17/30 (2006.01)

(52) U.S. Cl.
CPC ....... *G06K 9/00677* (2013.01); *G06F 3/0484* (2013.01); *G06F 3/16* (2013.01); *G06F 17/30259* (2013.01); *G06F 17/30274* (2013.01); *G06F 17/30752* (2013.01); *G06F 17/30769* (2013.01); *G06K 9/00087* (2013.01); *G06K 9/00288* (2013.01)

(58) Field of Classification Search
None
See application file for complete search history.

(56) References Cited

U.S. PATENT DOCUMENTS

| 2005/0192924 A1 | 9/2005 | Drucker et al. |
| 2009/0116684 A1 | 5/2009 | Andreasson |
| 2009/0119333 A1 | 5/2009 | Sundstrom et al. |
| 2009/0158207 A1 | 6/2009 | Nakada et al. |
| 2012/0237090 A1 | 9/2012 | Ikenoue et al. |
| 2013/0145260 A1 | 6/2013 | Munekuni |
| 2015/0206523 A1 | 7/2015 | Song et al. |

(Continued)

FOREIGN PATENT DOCUMENTS

| CN | 102045439 A | 5/2011 |
| CN | 102256030 A | 11/2011 |
| CN | 104268150 A | 1/2015 |

(Continued)

OTHER PUBLICATIONS

International Search Report dated Aug. 17, 2016 for International Application No. PCT/CN2015/099608, 10 pages.

(Continued)

*Primary Examiner* — Randolph I Chu
(74) *Attorney, Agent, or Firm* — Brinks, Gilson & Lione

(57) ABSTRACT

The present disclosure is related to a photo album based music selection method, apparatus and device, and a storage medium. When a certain photo album is viewed on a device, the corresponding music can be automatically selected and played based on a character relationship determined according to the method between the viewer and a person being viewed in a picture of the photo album, which decreases the complexity of operations of the user, and thereby improves the user experience.

20 Claims, 10 Drawing Sheets

(56) References Cited

U.S. PATENT DOCUMENTS

2015/0324352 A1* 11/2015 Meyer ................... G06F 3/011
                                                                  382/103

FOREIGN PATENT DOCUMENTS

| CN | 104268547 A | 1/2015 |
|---|---|---|
| EP | 2 509 004 A1 | 10/2012 |
| JP | 2005-276178 A | 10/2005 |
| JP | 2006-155095 A | 6/2006 |
| JP | 2006-164229 A | 6/2006 |
| JP | 2006-261933 A | 9/2006 |
| JP | 2011-118710 A | 6/2011 |
| JP | 2013-083689 A | 5/2013 |
| JP | 2013-120414 A | 6/2013 |
| JP | 2014-174782 A | 9/2014 |
| RU | 2 351 981 C2 | 4/2009 |

OTHER PUBLICATIONS

Office Action dated Aug. 18, 2017 for Russian Application No. 2016134776/08, 3 pages.
Extended European Search Report dated Apr. 3, 2017 for European Application No. 16169442.7, 7 pages.
Office Action dated Dec. 19, 2017 for Japanese Application No. 2016-520060, 6 pages.

* cited by examiner

900

MULTIMEDIA PRESENTATION METHOD AND APPARATUS

CROSS REFERENCE TO RELATED APPLICATIONS

This application claims priority to Chinese Patent Application No. 2015108457448, filed on Nov. 26, 2015, the entirety of which is hereby incorporated by reference herein.

TECHNICAL FIELD

The present disclosure relates to the technical field of multimedia presentation, in particular to a photo album based music selection method, apparatus and computing device, and a storage medium.

BACKGROUND

A user often uses a computing device such as a camera enabled mobile phone to take pictures and store the photographed pictures in the computing device. Photo album management applications with face recognition capabilities have been provided for managing and organizing stored pictures based on attributes of the stored pictures.

When the user browses pictures in different photo albums or other collections of associated pictures, in order to encourage a certain atmosphere, the user may want to play some music. For example, when the user is viewing the photo album of a baby, the user may select to play some music that is bright and of children interests to add atmosphere. However, the selection of music is generally performed manually, that is to say, the user usually needs to manually choose and switch the desired music when the user browses pictures in different photo albums.

SUMMARY

According to an exemplary embodiment of the present disclosure, there is provided a photo album based music selection method. The method may comprise acquiring a watching instruction triggered by a user for watching pictures in a target photo album, acquiring feature information of the user, determining a character relationship between the user and a person being watched corresponding to the pictures in the target photo album based on the feature information of the user, determining a target music type corresponding to the character relationship based on a preset correspondence relationship between each character relationship and each music type, and presenting the pictures in the target photo album and music corresponding to the target music type.

According to another exemplary embodiment of the present disclosure, there is provided an apparatus for playing music based on a photo album. The apparatus may comprise a first acquiring module configured to acquire a watching instruction triggered by a user for watching pictures in a target photo album, a second acquiring module configured to acquire feature information of the user, a first determining module configured to determine a character relationship between the user and a person being watched corresponding to the pictures in the target photo album based on the feature information of the user, a second determining module configured to determine a target music type corresponding to the character relationship determined by the first determining module based on a preset correspondence relationship between each character relationship and each music type, and a presentation module configured to present the pictures in the target photo album and music corresponding to the target music type determined by the second determining module.

According to another exemplary embodiment of the present disclosure, there is provided a computing device. The computing device may comprise a processor, and a memory configured to store processor executable instructions. The processor may be configured to execute the instructions to acquire a watching instruction triggered by a user for watching pictures in a target photo album, acquire feature information of the user, determine a character relationship between the user and a person being watched corresponding to the pictures in the target photo album based on the feature information of the user, determine a target music type corresponding to the character relationship based on a preset correspondence relationship between each character relationship and each music type, and present the pictures in the target photo album and music corresponding to the target music type.

According to another exemplary embodiment of the present disclosure, there is provided a non-transitory computer-readable storage medium having stored therein instructions that, when executed by a processor of a mobile device, causes the mobile device to perform a photo album based music selection method. The method may comprise acquiring a watching instruction triggered by a user for watching pictures in a target photo album, acquiring feature information of the user, determining a character relationship between the user and a person being watched corresponding to the pictures in the target photo album based on the feature information of the user, determining a target music type corresponding to the character relationship based on a preset correspondence relationship between each character relationship and each music type, and presenting the pictures in the target photo album and music corresponding to the target music type.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise presented. The embodiments set forth in the following description of exemplary embodiments do not represent all embodiments consistent with the invention. Instead, they represent examples of apparatuses and methods consistent with aspects related to the invention as recited in the appended claims. The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Figure 1:
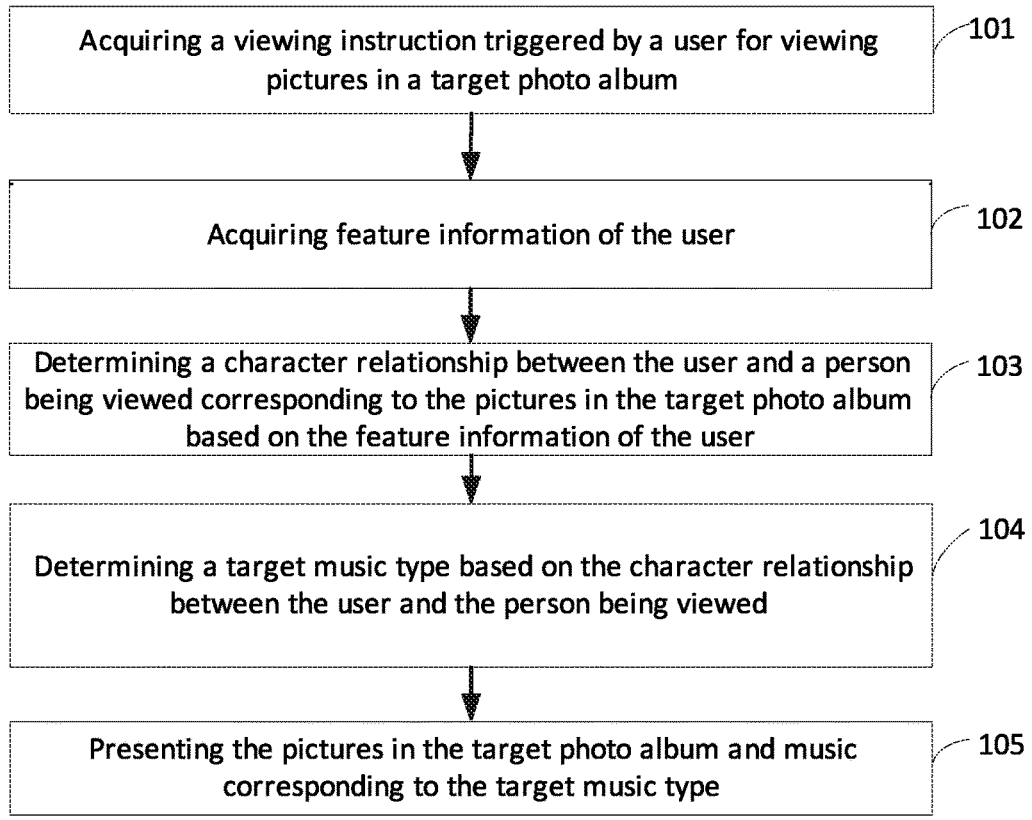
FIG. 1 shows a flowchart showing embodiment one of a photo album based music selection method according to an exemplary embodiment.

FIG. 1 shows a flowchart 100 of logic that may be implemented by an exemplary device to implement a photo album based music selection method according to an exemplary embodiment. The exemplary device may be an electronic device configured to display digital images (e.g., digital pictures or photographs) that are included in the photo album and also configured to play audible music or other audio sounds. The photo album based music selection method may be part of an application (i.e., app) running on the device. The exemplary electronic device referenced in terms of FIG. 1, and elsewhere throughout this disclosure, may be a communication device that includes well known computing systems, environments, and/or configurations suitable for implementing features described herein such as, but not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like.

The photo album referenced in FIG. 1, and elsewhere throughout this disclosure, may be a face photo album where each digital image included in the face photo album depicts at least one person that shares a particular relationship status with a viewer (e.g., owner) of the electronic device on which the photo album is stored and/or displayed. In addition or alternatively, the photo album may be collection of one or more associated digital images, where the association may be based on an identity of a person depicted in the digital images (e.g., each digital image in photo album A may include a depiction of person A, among other objects and/or people), a location depicted in the digital images (e.g., each digital image in photo album B may include a depiction of location B, among other objects and/or people), a common theme depicted throughout the digital images (e.g., each digital image in photo album C may include objects and/or people that are related by a common theme such as a birthday event). The association may further relate in some way to a viewer (e.g., owner) of the electronic device on which the photo album is stored and/or displayed. Further, the association information may be described by metadata corresponding to the photo album and/or metadata corresponding to each digital image that is included in the photo album.

At 101: the application may acquire a viewing instruction triggered by a user for viewing pictures in a target photo album (the user may also be hereinafter referred to as the viewer). For example, the application may receive the viewing instruction based on inputs provided by the user to an input interface included in the device. The target photo album may include one or more pictures that include image data representative of a captured environment, where the captured environment may include one or more persons. In particular, the captured environment may include at least partial views of a person's face. The target photo album may be stored on a local memory of the device, or may be stored at a remote location (e.g., a database server) in communication with the device over a communications network.

At 102: The application may acquire feature information of the user, where the feature information of the user may be used to identify the user. For example, the feature information may include attributes describing physical characteristics of the user (e.g., height, hair color, eye color, facial features). The feature information may also be an image that includes image data representative of the user's face ("face image"). The feature information may be acquired by accessing the feature information from a local memory of the device, receiving the feature information based on information received from user inputs, or accessed from a database in communication with the device.

At 103: the application may determine a character relationship between the user and a person being viewed in the target photo album based on, at least, the feature information of the user. For example, the character relationship may identify a father-son relationship, mother-daughter relationship, best friends relationship, co-workers relationship, or other identifiable relationship between two persons. The person being viewed may correspond to a person included in the environment captured by a picture included in the target photo album that is currently being displayed on a display screen of the device. The person being viewed may be identified based on feature information of the person being viewed, including facial recognition of that person or metadata corresponding to the photo album that identifies the person being viewed.

At 104: the application may determine a target music type based on the determined character relationship between the user and the person being viewed. For example, the application may include, or otherwise have access to, one or more preset correspondence relationships, where each preset correspondence relationship may map to one or more types of music. The preset correspondence relationship may be one or more character relationships such as father, son, mother, sister, cousin, aunt, uncle, nephew, niece, grandmother, grandfather, co-workers, best friends, or other known relationship between persons. Therefore, the application may reference the preset correspondence relationships to lookup the determined character relationship, identify the determined character relationship and corresponding music types from the preset correspondence relationships, and determine the target music type to be the corresponding music types identified from the preset correspondence relationships. The target music type may include a music clip stored on a local memory of the device. In addition or alternatively, the music clip may be stored on an off-site server operated by a third-party music provider such that the target music type may be accessed by the application and received from the off-site server via streaming the music clip and/or downloading the music clip from the off-site server.

At 105: the application may control presentation of the pictures in the target photo album and music corresponding to the determined target music type. For example, the application may operate to control presentation of the pictures included in the target photo album on the device. At the same time, the application may control playing of a target music type determined to correspond to the presented picture on the device.

In this embodiment, the above user viewing the pictures in the target photo album in a device may, or may not, be the owner or operator of the device running the application. Therefore, when the device acquires a viewing instruction triggered by the user for viewing the target photo album based on an input from the user (e.g., clicking on a graphical user interface object, a physical button, or touch button area, for viewing the target photo album), the device may trigger the acquisition of the feature information of the user.

The feature information of the user, for instance, may be information for recognizing an identity of the user, (e.g., facial recognition information, identity image including data representative of a face, or fingerprint information corresponding to the user). Based on the feature information, the identity of the user, i.e., the viewer, can be determined by the application.

The character relationship between the user and the person being viewed in the pictures of the target photo album may be determined based on the feature information of the user. For example, when the feature information of the user identifies the user as the owner of the device, the application may determine the user belongs to an A type character relationship with the person being viewed. When the feature information identifies that the user is not the owner of the device, the application may determine the user belongs to a B type character relationship with the person being viewed. The type of character relationship may be determined based on the character relationship between the preset user identity (i.e., whether the user is the owner of the device) and the person being viewed.

The determined character relationship type may also identify a preset music type. Then, based on the preset music type corresponding to each character relationship, the target music type corresponding to the character relationship between the current user that is viewing the target photo album and the person being viewed in a picture of the target photo album is determined. While presenting the pictures in the target photo album, the music identified by the target music type may also be played when the corresponding picture is presented.

In this embodiment, when the user views pictures in a certain target photo album, a character relationship between the user and image recognition data (e.g., facial recognition information of an image) of a person captured in a picture of target photo album, i.e., the person being viewed, may be determined based on the feature information of the user, and thereby it is possible to achieve an automatic selecting and playing of music of a corresponding music type based on the determined character relationship. When a target photo album is presented on the device, the corresponding music may be automatically selected and played based on the character relationship between the user viewer and the person included in a picture of the target photo album that is presently being presented on the device, which decreases the complexity of operations for the user, and thereby improves the user experience.

The foregoing embodiment has mentioned that the identity of the user viewing the target photo album may be determined based on the acquired feature information of the user. In the following, an example in which the feature information of the user is face image will be taken, that may build upon the features of the embodiment shown in FIG. 2, to explain how to determine the user identity and how to determine the character relationship between the user and the person being viewed based on the user identity.

Figure 2:
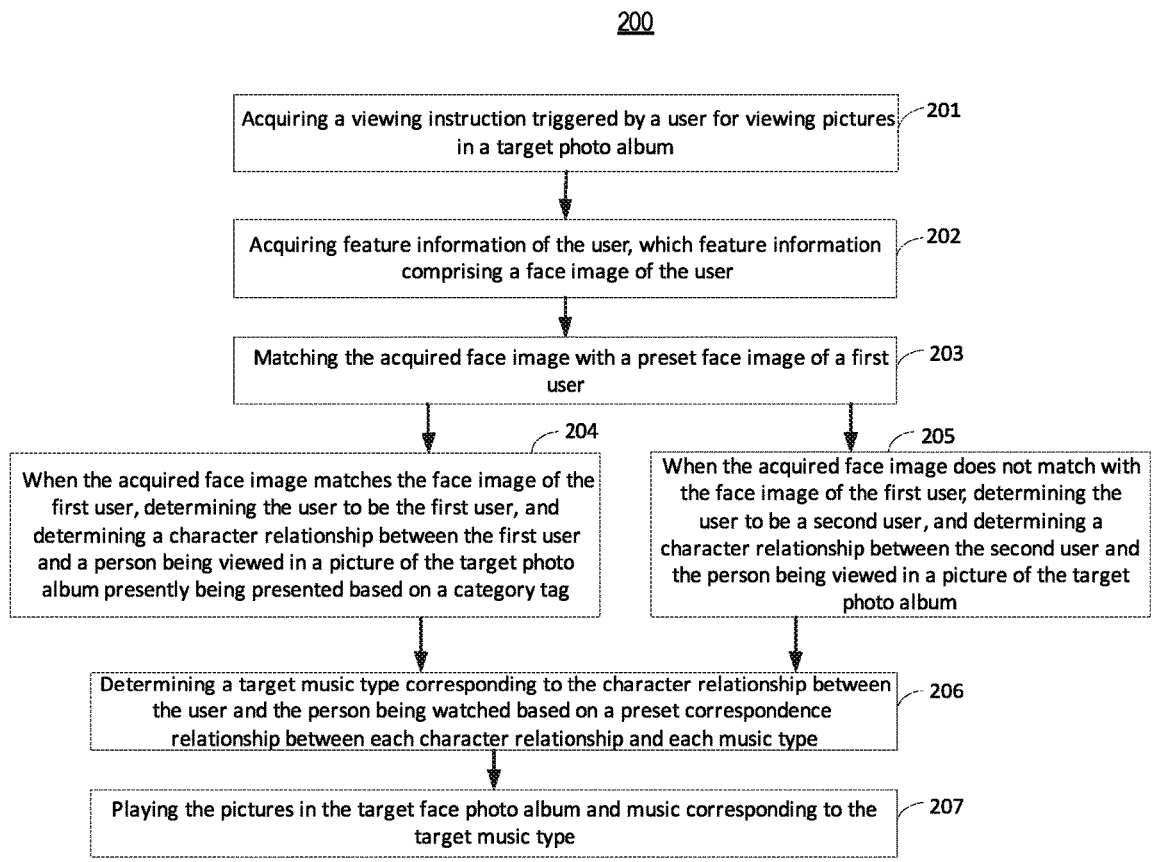
FIG. 2 shows a flowchart showing embodiment two of a photo album based music selection method according to an exemplary embodiment.

FIG. 2 shows a flowchart 200 of logic that an exemplary device may implement according to a photo album based music selection method in an exemplary embodiment. The exemplary device may, for example, be the exemplary device described with reference to FIG. 1. The photo album based music selection method may be part of an application (i.e., app) running on the device.

At 201: the application may acquire a viewing instruction triggered by a user for watching pictures in a target photo album. For example, the application may receive the viewing instruction based on inputs provided by the user to an input interface included in the device. The target photo album may include one or more pictures that include image data representative of a captured environment, where the captured environment may include one or more persons. In particular, the captured environment may include at least partial views of a person's face. The target photo album may be stored on a local memory of the device, or may be stored on a database in communication with the device.

At 202: the application may acquire feature information of the user, where the feature information comprises an image that includes image data representative of the user's face ("face image").

At 203: the application may match the acquired face image with a preset face image of a first user. The preset face image of the first user may, for example, be acquired by accessing from a local memory of the device, receiving the preset face image of the first user as an input based on information received from user inputs (e.g., download, upload, streaming), or accessed from a database in communication with the device.

At 204: when the acquired face image matches with the face image of the first user, the application may determine the user to be the first user. The application may further determine a character relationship between the first user and the person being viewed in a picture of the target photo album that is presently being presented on the device based on a category tag. The category tag may be set by the first user for the target photo album.

At 205: when the acquired face image does not match with the face image of the first user, the application may determine the user to be a second user, and further determine a character relationship between the second user and the person being viewed in a picture of the target photo album that is presently being presented on the device.

At 206: the application may determine a target music type corresponding to the character relationship between the user and the person being viewed based on a preset correspondence relationship between each character relationship and each music type. The preset correspondence relationship may, for example, be a table or other data format that maps a preset correspondence relationship to a certain music type.

At 207: the application may control the pictures in the target photo album to be presented (e.g., displayed) on the device, and also to control the music corresponding to the target music type to play on the device.

In this embodiment, the first user may be understood to be the owner of the device where a plurality of photo albums comprising the target photo album are stored, i.e., the owner of the device is the viewer, and, selecting the target photo album for viewing from the plurality of photo albums stored in the device can trigger the transmitting of the above mentioned viewing instruction to the device.

Regarding the identity recognition process that determines whether the user is the first user, the face image of the user may be digitally photographed after the viewing instruction triggered by the user is received. Therefore, the determination of whether the user is the first user can be implemented by performing a feature matching process that matches the face image with the face image of the first user which is pre-stored in the device, and when the user is determined not to be the first user, the user may be determined to be the second user.

Wherein, during the process of matching the acquired face image with the preset face image of the first user, feature points, such as the feature points of a face's profile, eyes, nose, mouth and ears, and/or other identifiable feature points of a person's face, of each face image may be extracted. Then, a similarity measurement may be performed to the feature points of the photographed face image with the feature points of the face image of the first user that are pre-stored, and if the similarity is determined to be greater than a certain threshold, they may be considered to be matched, and the user may be determined to be the first user. Otherwise, when the similarity is determined to fall below the certain threshold, the user may be considered to be the second user.

The above method may be implemented by the application for distinguishing the first user and the second user based on a captured face image of the user that may be analyzed to identify feature information of the user from the user's image. The user's image may be captured by a digital camera of the device. According to some embodiments, fingerprint information of the user can also be taken as the feature information of the user as a basis for distinguishing the first user and the second user.

According to some embodiments, when the user triggers a viewing instruction by selecting the target photo album via a touch screen input of the device, the fingerprint information of the user may be collected based on the user's touch screen input. For example, attributes of the user's fingerprint as the user's fingerprint touches the touch screen may be sensed by the touch screen display that represent the user's fingerprint as fingerprint information. Then, the acquired fingerprint information may be matched with the preset fingerprint information of the first user, and when the fingerprint information matches with the fingerprint information of the first user, the user may be determined to be the first user, and the character relationship between the first user and the person being viewed in a picture of the target photo album presently being presented, or otherwise included in the target photo album, may be determined based on the category tag set by the first user for the target photo album. When the fingerprint information does not match with the fingerprint information of the first user, the user may be determined to be the second user, and the character relationship between the second user and the person being viewed in a picture of the target photo album presently being presented on the device, or otherwise included in the target photo album, may be determined.

The device may store a plurality of photo albums, where each photo album may include one or more pictures that are comprised of digital image data representing a captured environment, where the captured environment may include a person's face. When creating each of the photo albums, a first user may set one or more category tags for one or more of the photo albums, where the category tag may identify a name for the photo albums. For example, a category tag may identify a corresponding photo album to be named a baby album, parent's album, wife album, or other relationship based tag names, where the tag names may be indicative of the first user's relationship to one or more persons included in pictures of the photo album. This way, the character relationship, such as father-son and husband-wife relationships, between the first user and the person being viewed in a corresponding photo album may be determined based on the category tag assigned to the photo album.

The category tags may also represent multidimensional classifications. For instance, a coarse classification may be applied to one or more, or all, of the photo albums stored on the device according to family, friends, or colleagues classification tags, and then a more fine-grained classification may be performed under each of the coarse classifications. For example, under the coarse classification of family, a high level "Family" album may further be categorized into different sub-albums that are grouped according to a common face depicted in digital images of the sub-albums. So the "Family" album may include a collection of separate family member specific sub-albums such as, for example: a "baby" sub-album that includes digital images that depict the user's child, a "parent" sub-album that includes digital images that depict one or more of the user's parents, a "siblings" sub-album that includes digital images that depict one or more of the user's siblings, other known family member specific sub-albums. Similar, under the coarse classification, a "Friends" album may include a collection of separate specific friend sub-albums, where each friend sub-album includes digital images that depict a specific friend of the user (e.g., a "Zhang San" sub-album may include digital images that depict Zhang San, and a "Li Si" sub-album may include digital images that depict Li Si. As such, the category tag applied to each photo album may include two main dimensions of coarse classification and disaggregated classification.

When the first user triggers the viewing of pictures in a certain target photo album, based on the category tag of the target photo album, the character relationship between the first user and the person being watched can be determined. For example, if the first user provides a user input to the device to view the target photo album with a category tag assigned to the target photo album (e.g., category tag may identify family—precious son), a relationship between the first user and a person captured in a picture of the target photo album may be determined according to the category tag of the target photo album (e.g., the first user and a baby captured in a picture included in the target photo album may be determined to be in a father and son parentage relationship based on the family—precious son category tag assigned to the target photo album).

In this embodiment, the correspondence relationship between each character relationship and each music type may be preset. For example, a parentage relationship type of character relationship may be preset to correspond to a music type that meets a certain criteria for the parentage relationship (e.g., is bright and identified as being interesting to children). A music database may store preset songs and/or sounds that are predetermined to be played as the music type that corresponds to the parentage relationship. According to some embodiments, the music type may be a predetermined song or music clip that has been identified as meeting the certain criteria. According to some embodiments, a song or music clip that satisfies the certain criteria may be searched and selected to be the music type.

As another example, a love relationship type of character relationship may be preset to correspond to a music type that meets a certain criteria for the love relationship (e.g., songs identified as sweet love songs). According to some embodiments, the music type may be a predetermined song or music clip that has been identified as meeting the certain criteria. According to some embodiments, a song or music clip that satisfies the certain criteria may be searched and selected to be the music type.

As another example, a user may preset a certain character relationship (e.g., friend relationship) to correspond to a particular song, or songs, as the corresponding music type.

Thus, after the character relationship between the first user and the person being viewed is determined, based on the above described preset correspondence relationship, the corresponding music type (i.e., target music type) may be obtained by the described matching process. When each music type is associated with one piece of music (e.g., a single song, single sound clip, single music clip, or single song playlist), the music may be directly played while the pictures in the target photo album are presented on the device. Of course, in a case where each music type is associated with multiple pieces of music, the music may be selectively played on the device in accordance with a preset playing mode, such as a random playing mode and a loop playing mode.

In this embodiment, the first user may sort pictures stored on the device into one or more photo albums and assign a category tag for each of the photo albums, and/or any existing sub-album within the photo album. When the first user inputs user commands to the device for viewing pictures in a certain photo album, the character relationship between the first user and the face image corresponding to the photo album, and/or any existing sub-album within the photo album, may be determined based on the category tag of the photo album, and thereby music may be automatically selected and played according to the corresponding music type based on the determined character relationship. When a certain photo album is viewed, the corresponding music may be automatically selected and played based on the character relationship between the user viewing pictures of the photo album (i.e., the viewer) and the person being viewed included in the pictures of the photo album. This decreases the complexity of operations of the user and thereby improves the user experience.

The above embodiment has mentioned that the first user may be the owner of the device where a plurality of photo albums comprising the above target photo album may be stored, since the category tag of each photo album may be set by the first user based on the character relationship between the first user and one or more persons included in a picture of the photo albums stored on the device. Therefore, the category tag may identify the character relationship between the first user and the one or more persons included in pictures of the photo albums stored on the device. However, when the viewer is determined not to be the first user, then the category tag may not directly reflect the character relationship between the viewer and the person being viewed. This may be because the character relationship identifies a relationship from the understood standpoint of the viewer/user being the owner of the device, and when the viewer/user is not the owner of the device, the relationship will not correctly identify the actual relationship of the viewer/user and a person included in a picture of a photo album stored on the device. Based on this situation, there is provided the embodiments represented in the following FIG. 3 and FIG. 4.

Figure 3:
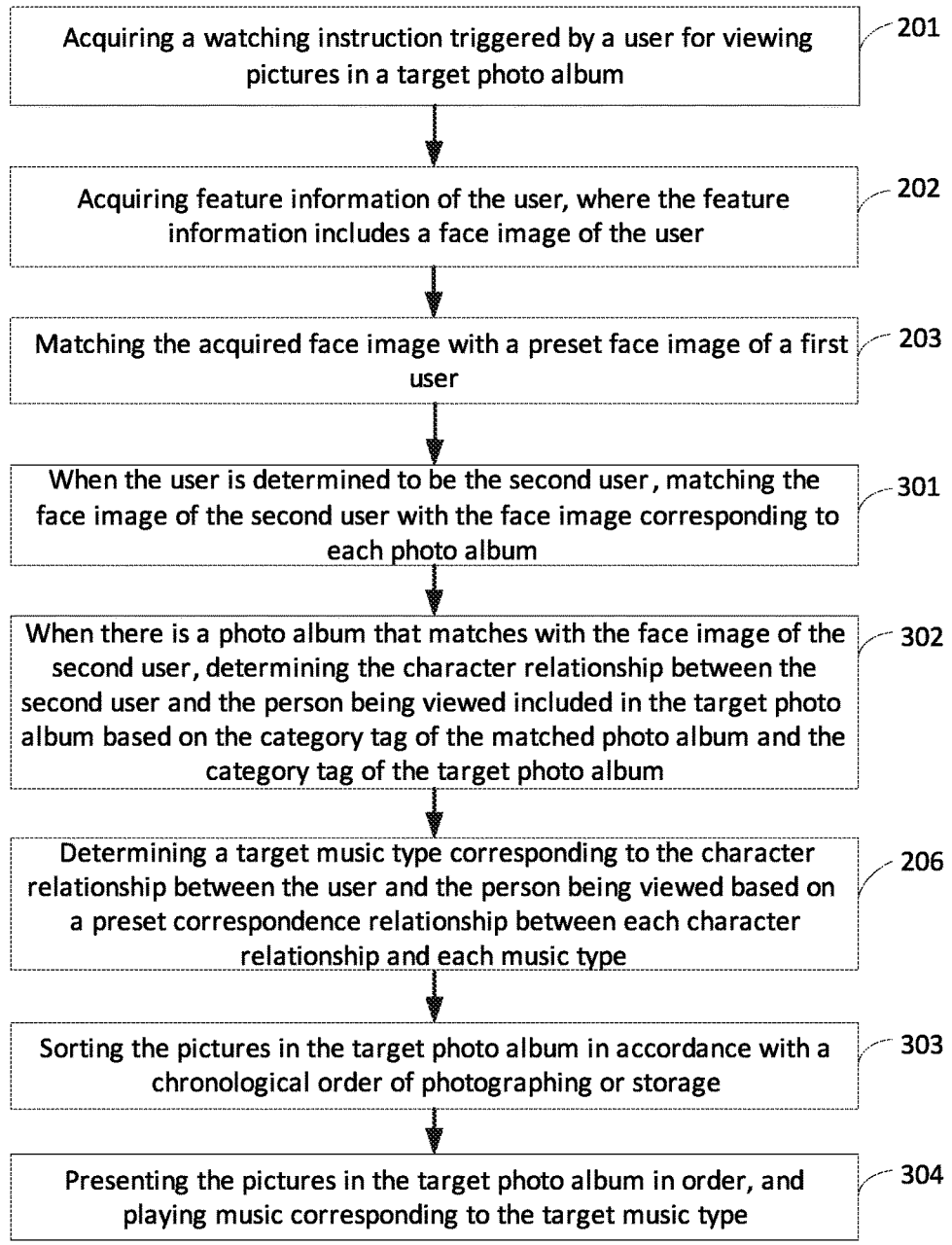
FIG. 3 shows a flowchart showing embodiment three of a photo album based music selection method according to an exemplary embodiment.
Figure 4:
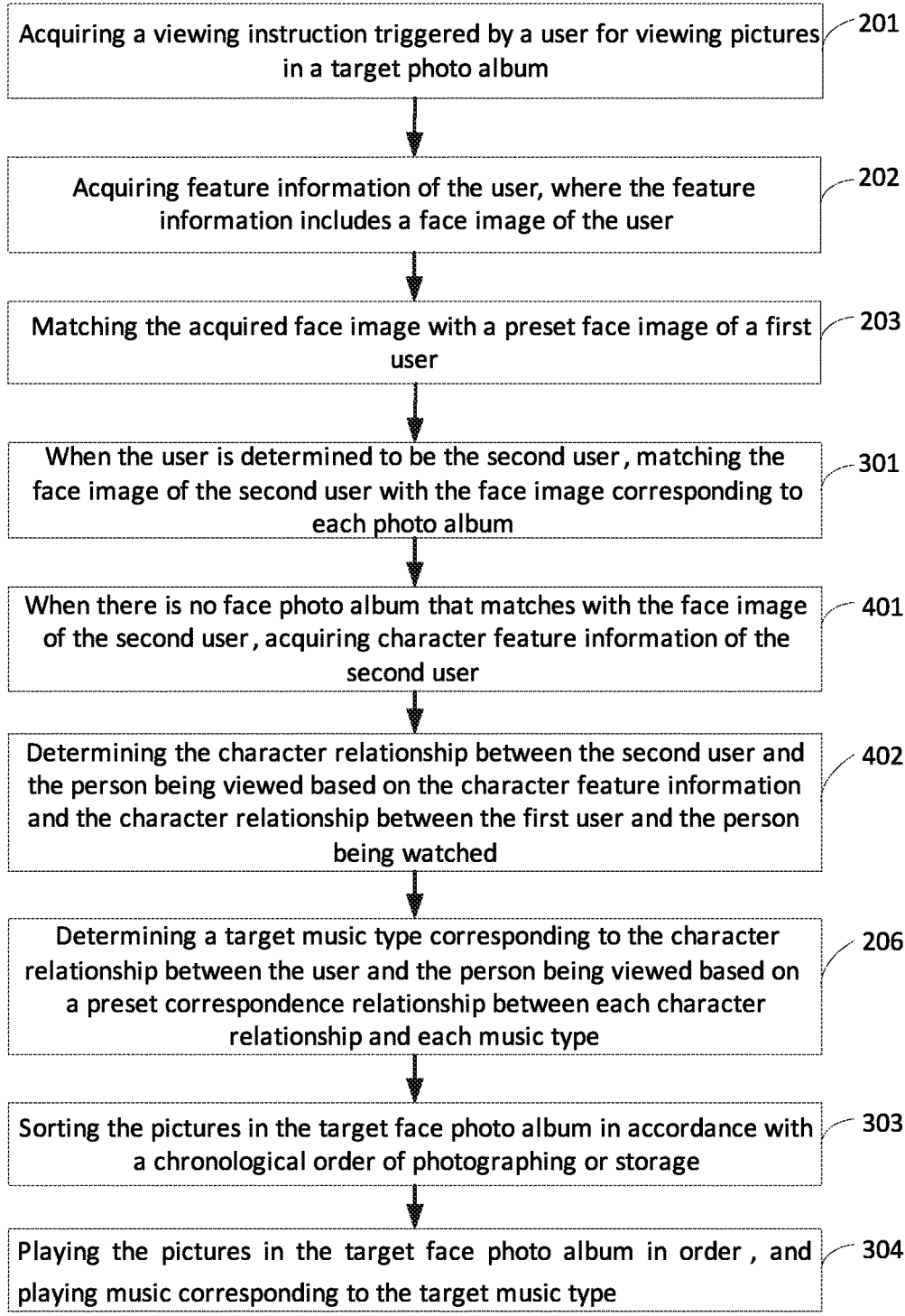
FIG. 4 shows a flowchart showing embodiment four of a photo album based music selection method according to an exemplary embodiment.

Before the embodiments shown in FIG. 3 and FIG. 4 are described in detail, the basis for determining whether the viewer is the first user or the second user will be explained. The following method may also be used to realize the determination of the first user and the second user.

Options may be presented in a viewing operation interface of the photo album for the viewer. The options may include, for example, viewing in person, others viewing, and/or viewing in person together with others. Thus, when the viewer inputs a user command that selects the options for viewing in person, this may be understood as indicating that the viewer is the first user. When the viewer inputs a user command that selects the options for others viewing, this may be understood as indicating that the viewer is the second user. When the viewer inputs a user command that selects the options for viewing in person together with others, the viewers may include not only the first user but also the second user at the same time. Thus when the user command selects the option for viewing in person together with others, this may be processed in a similar, or same, manner as the situation where it is determined that the second user is viewing, which will be explained in the following.

FIG. 3 shows a flowchart 300 of logic for implementing a photo album based music selection method according to an exemplary embodiment. The exemplary device may, for example, be the exemplary device described with reference to FIG. 1. The photo album based music selection method may be part of an application (i.e., app) running on the device. As shown in FIG. 3, determining the character relationship between the second user and the person being viewed in the pictures in the target photo album in the above mentioned process 205 from flowchart 200 may be implemented by the following processes:

At 301: when the user is determined to be the second user, the application may compare the face image of the second user with the face image corresponding to one or more of the photo albums stored on the device.

At 302: when the application determines there is a face image corresponding to a photo album that matches with the face image of the second user based on the comparison, the application may further determine the character relationship between the second user and the person being viewed in a picture of the target photo album based on the photo album corresponding to the matched face image. For example, the photo album corresponding to the matched face image may be assigned a category tag, such that the category tag of the photo album corresponding to the matched face image may be determined to identify the character relationship between the second user and the person being viewed in the picture of the target photo album.

In this embodiment, when the viewer is not only the owner of the device, i.e., the first user, but is determined to also be the second user, the above mentioned face image of the second user may be acquired during the process of recognizing the user identity by taking the face image as the feature information of the user. However, during the process of recognizing the user identity by taking the fingerprint information as the feature information of the user, the fingerprint information may be acquired after the current user is determined to be the second user when the device is triggered to photograph the face image of the second user, such as to photograph using a front camera of the device that also includes a main display screen.

When the viewer actually comprises a plurality of persons viewing a photo album, i.e., corresponding to the above mentioned situation of watching together, the photographed picture for representing the feature information may contain a plurality of face images. In such cases, a face recognition technology such as Adaboost technology may be used to perform a face recognition process, so as to obtain a face image for each of the persons included in the photographed picture.

Then, the acquired face image, or face images, of the second user may be compared and matched with a face image corresponding to each photo album stored on the device. For example, the acquired face images of the second user may be matched to a face image corresponding to a photo album when a similarity measurement of the comparison determines the similarity measurement surpasses a predetermined threshold. During the matching process, feature points, such as the feature points of profile, eyes, nose, mouth and ears, and/or other identifiable feature points of a person's face, of each face image may be extracted from the acquired face image. Then, the similarity measurement may be performed to the feature points of the acquired face image with the feature points of the face image corresponding to each photo album, and when the similarity is greater than a certain threshold, they may be considered to be matched.

The feature points of the face image corresponding to each photo album may be pre-extracted and stored on a local memory of the device, or stored on an off-site database accessible by the device, and when there the above mentioned matching process is implemented, the feature points of the photographed face image may be obtained from the local memory, or accessed from the database, in real time, or substantially real time. Therefore, the matching processing efficiency is improved.

When the face image of the second user is matched to a certain photo album, this may indicate that a photo album of the second user has also been stored in the device that is owned, or otherwise associated with, the first user. Therefore, the matched photo album also has a category tag set by the first user therefor. Thus the character relationship between the second user and the person being viewed may be determined in combination with the above category tag and the category tag of the target photo album being viewed.

To be specific, similar to determining the character relationship between the first user and the person being viewed, the character relationship between the first user and the second user may be determined based on the category tag of the matched photo album, and then, the character relationship between the second user and the person being viewed may be determined based on the character relationship between the first user and the person being viewed and the character relationship between the first user and the second user.

For instance, consider the situation where the viewer is user B, and user B is the second user, the first user is user A, and the person being viewed is user C. Wherein, in this situation the category tag set by the first user A for the target photo album corresponding to the person being viewed C is baby, then the character relationship between the first user A and the person being viewed C may be assigned as a parentage relationship. By the face image matching processing, the second user B may be determined to correspond to the photo album with a category tag of friend-Zhang San, then the character relationship between the first user A and the second user B may be determined to be a friend relationship, and thereby the relationship between the second user B and the person being viewed C may be determined to be elder-younger relationship.

Optionally, in this embodiment, on the basis of the embodiment shown in FIG. 2, before step 207 in flowchart 200, there may also comprise the following steps:

At 303: sorting the pictures in the target photo album in accordance with a chronological order of photographing or storage.

In this embodiment, when the viewer is viewing pictures in the target photo album, the pictures may be played in the form of slides that are displayed in a sequence. Regarding the playing sequence of the pictures, it may be determined in accordance with a chronological order of the time the picture was photographed, or may also be determined in accordance with a chronological order of storage of the pictures into the target photo album.

Correspondingly, the playing process in step 207 of flowchart 200 may include:

At 304: presenting the pictures in the target photo album in order, and playing music corresponding to the target music type determined to correspond to the target photo album and/or pictures included in the target photo album.

In this embodiment, when the viewer is not the creator of the photo album, e.g., not the owner of the device where the photo album is stored, by collecting the face image of the viewer and matching it with the face image corresponding to each photo album, when the viewer belongs to a certain photo album, the character relationship between the viewer and the person being viewed may be obtained based on the category tag of the matched photo album and the category tag of the target photo album being viewed, with the owner of the device as a medium, and thereby an automatic selecting and playing of music based on the character relationship may be realized.

FIG. 4 shows a flowchart 400 of logic that an exemplary device may implement according to a photo album based music selection method according to an exemplary embodiment. The exemplary device may, for example, be the exemplary device described with reference to FIG. 1. The photo album based music selection method may be part of an application (i.e., app) running on the device. As shown by flowchart 400 in FIG. 4, after the above described process at 301, the method may also comprises the following:

At 401: when the application determines there is no photo album that matches with the face image of the second user, the application may acquire character feature information of the second user.

At 402: the application may determine the character relationship between the second user and the person being viewed based on the character feature information and the character relationship between the first user and the person being viewed.

After the process at 402, the subsequent relevant steps may be performed.

When no matched photo album are found in a feature information comparison between the face image of the second user and the face image corresponding to each photo album, extraction of specific feature points may be performed to the face image of the second user to thereby obtain character feature information (e.g., gender or age group) of the second user. The character feature information may be attribute information assigned to a user (e.g., second user) that describes certain attributes of the user. For example, the character feature information may identify a gender of the user, an age group the user belongs to, an address for the user, contact information for the user, height of the user, weight of the user, hair color of the user, eye color of the user, or other attribute that may describe an attribute of the user. Wherein, the feature points may be any one or more of the exemplary feature points described herein.

In this embodiment, a large amount of statistical analysis of the face image may be performed in advance to obtain a correspondence relationship between the feature points and the character feature information of a user (e.g., such as gender and age group).

Assume that the second user is determined to be a female within the age group of 50-60 through the character feature information of the second user, and the character relationship between the first user and the person being viewed determined through the category tag of the target photo album is parentage relationship, then it may be determined that the character relationship between the second user and the person being viewed is an elder-younger relationship.

In an effort to provide an accurate determination of the character relationship, the character feature information, such as gender and age, of the first user may be stored in the device in advance. Thus, the character relationship between the second user and the person being viewed may be determined in combination with the character feature information of the second user, the character feature information of the first user, and the character relationship between the first user and the person being viewed.

In addition or alternatively, the character feature information of the person being viewed, i.e., the face image corresponding to each photo album, may also be pre-stored, thereby the character relationship between the second user and the person being viewed may be determined in combination with the character feature information of the second user, the character feature information of the person being viewed, and the character relationship between the first user and the person being viewed.

For instance, in the case where the second user is determined to be a female within the age group of 20-25 based on the character feature information of the second user, the pre-stored character feature information of the first user may identify the first user is a female aged 23, and the character relationship between the first user and the person being viewed may be determined through the category tag of the target photo album to be a husband-wife relationship. In this case, it may be considered that the character relationship between the second user and the person being viewed is a friend relationship.

For another example, consider the case where the second user is determined to be a female within the age group of 20-25 based on the character feature information of the second user, the pre-stored character feature information of the person being viewed identifies the person being viewed is a female aged 23, and the character relationship between the first user and the person being viewed determined through the category tag of the target photo album to be a husband-wife relationship. In this case, it may be considered that the character relationship between the second user and the person being watched is a friend relationship.

In this embodiment, when the viewer is not the owner of the device, and the viewer does not belong to a photo album stored in the device, by extracting features of the face image of the viewer, the character relationship between the viewer and the person being viewed may be obtained based on the extracted character feature information and the character relationship between the owner of the device and the person being viewed with the owner of the device as a medium, and thereby an automatic selecting and playing of music based on character relationship may be realized.

Figure 5:
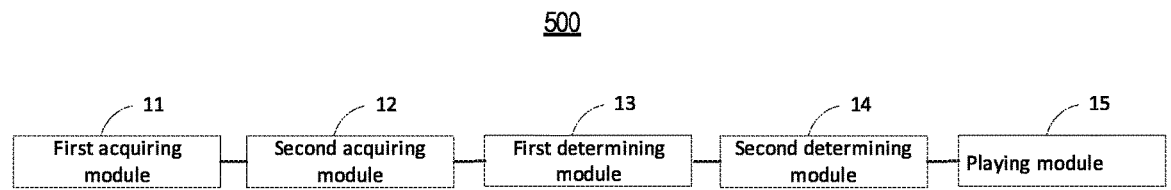
FIG. 5 shows a block diagram showing embodiment one of a photo album based music playing apparatus according to an exemplary embodiment.

FIG. 5 shows a block diagram showing an exemplary embodiment of a photo album based music playing apparatus 500. The apparatus 500 may be configured to implement the method described by flowchart 100. As shown in FIG. 5, the apparatus 500 comprises a first acquiring module 11, a second acquiring module 12, a first determining module 13, a second determining module 14, and a playing module 15. A module as described in this disclosure may be a representation of software, hardware, circuitry, or a combination thereof, configured to implement features attributed to the module.

The first acquiring module 11 may be configured to acquire a viewing instruction triggered by a user for watching pictures in a target photo album.

The second acquiring module 12 may be configured to acquire feature information of the user.

The first determining module 13 may be configured to determine a character relationship between the user and a person being viewed corresponding to the pictures in the target photo album based on the feature information of the user.

The second determining module 14 may be configured to determine a target music type corresponding to the character relationship determined by the first determining module based on a preset correspondence relationship between each character relationship and each music type.

The playing module 15 may be configured to present the pictures in the target photo album and music corresponding to the target music type determined by the second determining module.

The apparatus 500 provided in this embodiment may be used to execute the technical solution of the method embodiment shown in FIG. 1.

In this embodiment, the above user that views the pictures in the target photo album in a certain device may be the owner of the device. Alternatively, the user may not be the owner of the device, for example, the user may be a relative of the owner. Therefore, when the first acquiring module 11 acquires a viewing instruction triggered by a user based on input commands selecting the target photo album for viewing, the second acquiring module 12 may be triggered to acquire the feature information of the user.

Wherein, the feature information of the user, for example, may be the feature information such as the face image, fingerprint, or other feature information for identifying the user's identity. The identity of the user, i.e., the viewer, can be determined based on the feature information.

Therefore, the first determining module 13 may determine the character relationship between the user and the person being viewed corresponding to the pictures in the target photo album based on the feature information of the user. For example, when the feature information of the user identifies that the user is the owner of the device, or identifies that the user is not the owner of the device. When the user is determined to be the owner of the device, it may be roughly considered that the user belongs to an A type character relationship with the person being viewed, based on the preset user identity, i.e., whether the user is the owner of the device, and the character relationship with the person being viewed. When the user is determined not to be the owner of the device, it may be roughly considered that the user belongs to a B type character relationship with the person being viewed, based on the preset user identity, i.e., whether the user is the owner of the device, and the character relationship with the person being viewed.

Then, the second determining module 14 may determine the target music type corresponding to the character relationship between the current viewer and the person being viewed based on the preset music type corresponding to each character relationship. The playing module 15 may then play the music corresponding to the target music type while presenting the pictures in the target photo album.

In this embodiment, when the user proceeds to view pictures in a certain photo album, the character relationship between the user and the face image corresponding to the photo album, i.e., the person being viewed, may be determined based on the feature information of the user, and thereby it is possible to achieve an automatic selecting and playing of music of a corresponding music type based on the character relationship. When a certain photo album is watched, the corresponding music can be automatically selected and played based on the character relationship between the viewer and the person being viewed, which decreases the complexity of operations of the user and thereby improves the user experience.

Figure 6:
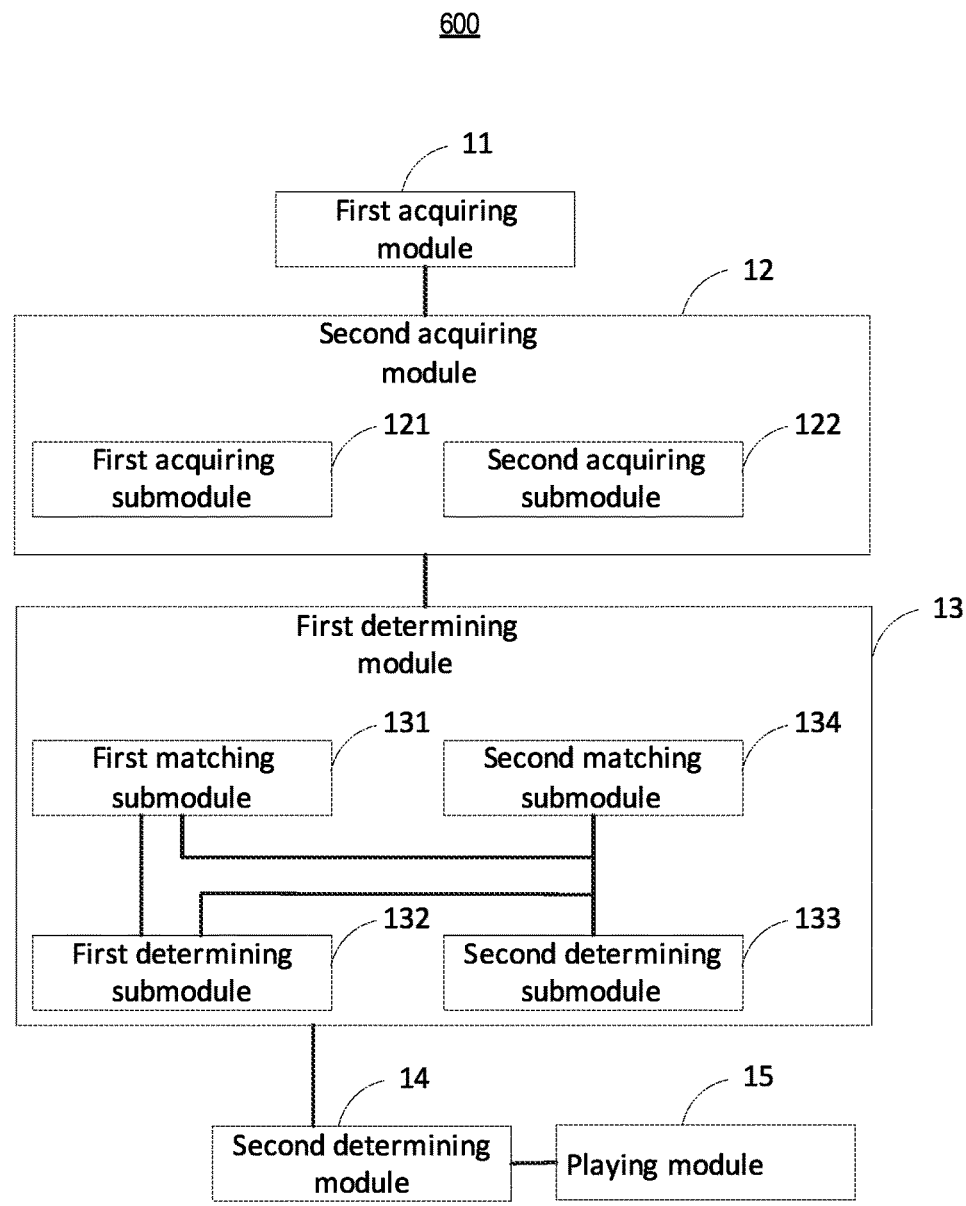
FIG. 6 shows a block diagram showing embodiment two of a photo album based music playing apparatus according to an exemplary embodiment.

FIG. 6 shows a block diagram showing an exemplary embodiment of a photo album based music playing apparatus 600. The apparatus 500 may be configured to implement the method described by flowchart 200. As shown in FIG. 6, apparatus 600 may build upon the components of the apparatus 500 shown in FIG. 5, where apparatus 600 includes the second acquiring module 12 that comprises: a first acquiring submodule 121 and/or a second acquiring submodule 122.

The first acquiring submodule 121 may be configured to acquire fingerprint information of the user.

The second acquiring submodule 122 may be configured to acquire a face image of the user.

Optionally, the first determining module 13 comprises: a first matching submodule 131 and a first determining submodule 132 and/or a second determining submodule 133.

The first matching submodule 131 may be configured to match the fingerprint information acquired by the first acquiring submodule 121 with preset fingerprint information of a first user.

The first determining submodule 132 may be configured to, when the fingerprint information matches with the fingerprint information of the first user, determine the user as the first user, and determine a character relationship between the first user and the person being viewed corresponding to the pictures in the target photo album based on a category tag set by the first user for the target photo album.

The second determining submodule 133 may be configured to, when the fingerprint information does not match with the fingerprint information of the first user, determine the user as a second user, and determine a character relationship between the second user and the person being viewed corresponding to the pictures in the target photo album.

According to some embodiments, the first determining module 13 comprises: a second matching submodule 134 and a first determining submodule 131, and/or a second determining submodule 132.

The second matching submodule 134 may be configured to match the face image acquired by the second acquiring submodule 122 with a preset face image of the first user.

The first determining submodule 131 may be configured to, when the face image matches with the face image of the first user, determine the user as the first user, and determine the character relationship between the first user and the person being viewed corresponding to the pictures in the target photo album based on a category tag set by the first user for the target photo album.

The second determining submodule 132 may be configured to, when the face image does not match with the face image of the first user, determine the user as the second user, and determine the character relationship between the second user and the person being viewed corresponding to the pictures in the target photo album.

The photo album based music playing apparatus 600 provided in this embodiment may be used to execute the technical solution of the method embodiment shown by flowchart 200 in FIG. 2.

In this embodiment, the first user refers to the owner of the device where a plurality of photo albums comprising the above target photo album are stored, i.e., the owner of the device is the viewer, and, selecting a target photo album intended to be watched from the plurality of photo albums stored in the device can trigger the transmitting of the above mentioned viewing instruction to the device.

Regarding the identity recognition process that whether the user is the first user, after the receiving of the viewing instruction triggered by the user, the second acquiring submodule 122 photographs the face image of the user, the second matching submodule 134 performs a feature matching to the face image with the face image of the first user which is pre-stored in the device, and thereby whether the user is the first user is determined, and if the user is not the first user, the user is determined to be a second user.

Wherein, during the process in which the second matching submodule 134 matches the acquired face image with the preset face image of the first user, the feature points, such as the feature points of profile, eyes, nose, mouth and ears, or other feature points described herein, of each face image may be extracted first. Then, a similarity measurement may be performed to the feature points of the photographed face image with the feature points of the face image of the first user, and if the similarity is determined to be greater than a certain threshold, they may be considered to be matched, and the first determining submodule 132 determines the user to be the first user, otherwise the second determining submodule 133 determines the user to be the second user.

The above is a basis for distinguishing the first user and the second user by taking the face image as the feature information of the user. Optionally, fingerprint information of the user can also be taken as the feature information of the user as a basis for distinguishing the first user and the second user.

To be specific, when the user triggers a viewing instruction, since the trigger action may be done by selecting a target photo album, the first acquiring submodule 121 may collect the fingerprint information of the user based on the received trigger action of the user. Then, the first matching submodule 131 matches the acquired fingerprint information with the preset fingerprint information of the first user. The first matching submodule 131 may compare the acquired fingerprint information with the preset fingerprint information, and when the fingerprint information matches with the fingerprint information of the first user, the first determining submodule 132 may determine the user to be the first user, and further determine the character relationship between the first user and the person being watched corresponding to the pictures in the target photo album based on the category tag set by the first user for the target photo album. When the fingerprint information does not match with the fingerprint information of the first user, the user may be determined to be a second user, and the character relationship between the second user and the person being viewed in the pictures in the target photo album may be determined.

In this embodiment, detailed explanation will be given on how to determine the character relationship between the first user and the person being viewed when the user is the first user, and the determination of the character relationship between the second user and the person being viewed will be described in the subsequent embodiments in detail.

The device has stored a plurality of photo albums. When the first user creates each photo album, the first user may assign a category tag for each photo album. The category tag may be the name of each photo album, such as baby, parents and wife, and the like. Thus, the character relationship, such as father-son and husband-wife relationships and the like, between the first user and the person being viewed corresponding to the photo album may be determined based on the category tag.

The category tags may also represent multidimensional classifications. For instance, a coarse classification may be applied to one or more, or all, of the photo albums stored on the device according to family, friends, or colleagues classification tags, and then a more fine-grained classification may be performed under each of the coarse classifications. For example, under the coarse classification of family, a high level "Family" album may further be categorized into different sub-albums that are grouped according to a common face depicted in digital images of the sub-albums. So the "Family" album may include a collection of separate family member specific sub-albums such as, for example: a "baby" sub-album that includes digital images that depict the user's child, a "parent" sub-album that includes digital images that depict one or more of the user's parents, a "siblings" sub-album that includes digital images that depict one or more of the user's siblings, other known family member specific sub-albums. Similar, under the coarse classification, a "Friends" album may include a collection of separate specific friend sub-albums, where each friend sub-album includes digital images that depict a specific friend of the user (e.g., a "Zhang San" sub-album may include digital images that depict Zhang San, and a "Li Si" sub-album may include digital images that depict Li Si. As such, the category tag applied to each photo album may include two main dimensions of coarse classification and disaggregated classification.

When the first user triggers the viewing of pictures in a certain target photo album, based on the category tag of the target photo album, the character relationship between the first user and the person being watched can be determined. For example, if the first user provides a user input to the device to view the target photo album by identifying a category tag assigned to the target photo album (e.g., category tag may identify family—precious son), a relationship between the first user and a person captured in a picture of the target photo album may be determined according to the category tag of the target photo album (e.g., the first user and a baby captured in a picture included in the target photo album may be determined to be in a father and son parentage relationship based on the family—precious son category tag assigned to the target photo album).

In this embodiment, the correspondence relationship between each character relationship and each music type may be preset. For example, a parentage relationship type of character relationship may be preset to correspond to a music type that meets a certain criteria for the parentage relationship (e.g., is bright and identified as being interesting to children). A music database may store preset songs and/or sounds that are predetermined to be played as the music type that corresponds to the parentage relationship. According to some embodiments, the music type may be a predetermined song or music clip that has been identified as meeting the certain criteria. According to some embodiments, a song or music clip that satisfies the certain criteria may be searched and selected to be the music type.

As another example, a love relationship type of character relationship may be preset to correspond to a music type that meets a certain criteria for the love relationship (e.g., songs identified as sweet love songs). According to some embodiments, the music type may be a predetermined song or music clip that has been identified as meeting the certain criteria. According to some embodiments, a song or music clip that satisfies the certain criteria may be searched and selected to be the music type.

As another example, a user may preset a certain character relationship (e.g., friend relationship) to correspond to a particular song, or songs, as the corresponding music type.

Thus, after the character relationship between the first user and the person being viewed is determined, based on the above described preset correspondence relationship, the corresponding music type (i.e., target music type) may be obtained by the described matching process. When each music type is associated with one piece of music (e.g., a single song, single sound clip, single music clip, or single song playlist), the music may be directly played while the pictures in the target photo album are presented on the device. Of course, in a case where each music type is associated with multiple pieces of music, the music may be selectively played on the device in accordance with a preset playing mode, such as a random playing mode and a loop playing mode.

In this embodiment, the first user may sort pictures stored on the device into one or more photo albums and assign a category tag for each of the photo albums, and/or any existing sub-album within the photo album. When the first user inputs user commands to the device for viewing pictures in a certain photo album, the character relationship between the first user and the face image corresponding to the photo album, and/or any existing sub-album within the photo album, may be determined based on the category tag of the photo album, and thereby music may be automatically selected and played according to the corresponding music type based on the determined character relationship. When a certain photo album is viewed, the corresponding music may be automatically selected and played based on the character relationship between the user viewing pictures of the photo album (i.e., the viewer) and the person being viewed included in the pictures of the photo album. This decreases the complexity of operations of the user and thereby improves the user experience.

Figure 7:
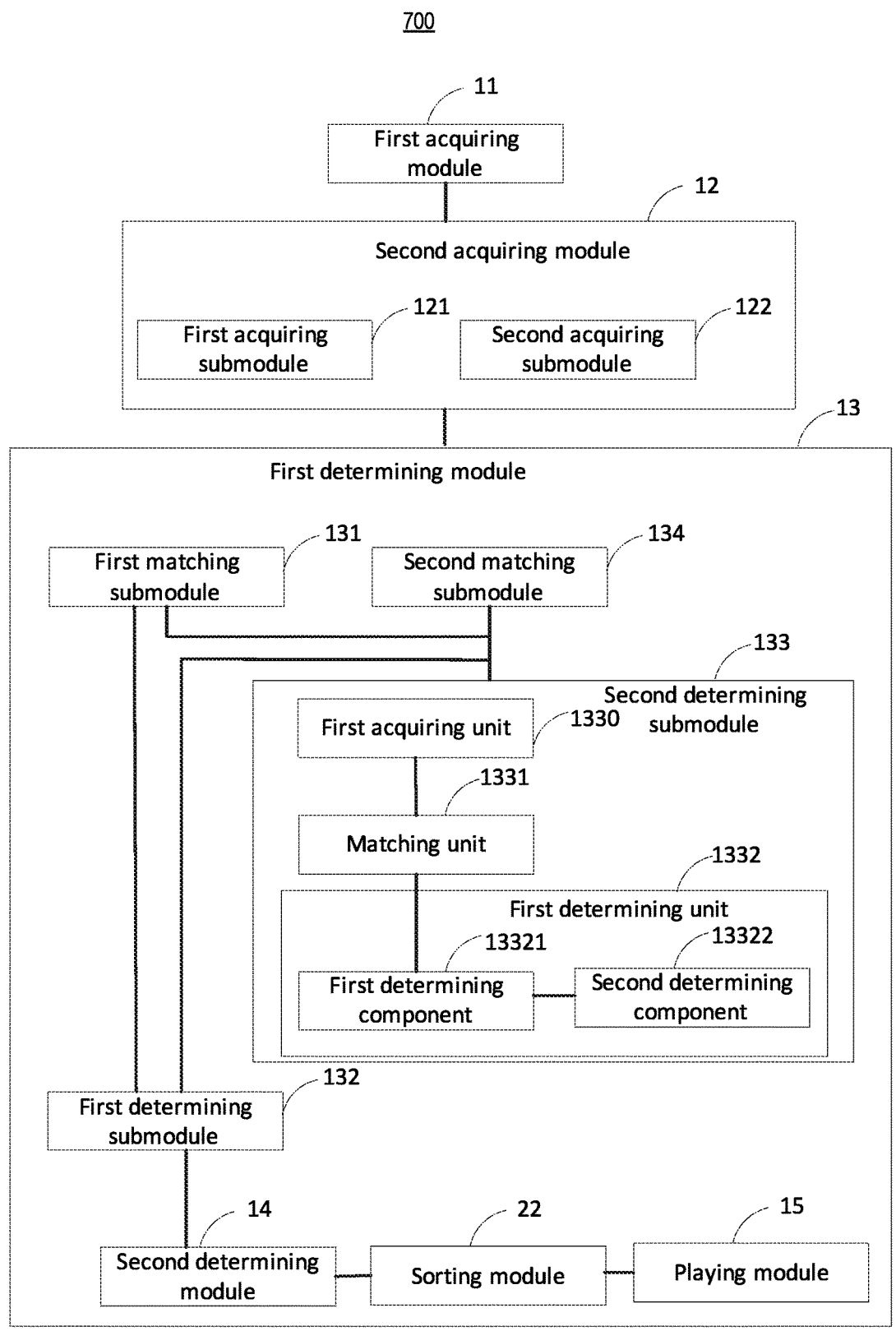
FIG. 7 shows a block diagram showing embodiment three of a photo album based music playing apparatus according to an exemplary embodiment.

FIG. 7 shows a block diagram showing an exemplary embodiment of a photo album based music selection apparatus 700. The apparatus 700 may be configured to implement the method described by flowchart 300. As shown in FIG. 7, apparatus 700 may build upon the components of the apparatus 600 shown in FIG. 6, where apparatus 700 includes the second determining submodule 133 that comprises: a first acquiring unit 1330, a matching unit 1331 and a first determining unit 1332.

The first acquiring unit 1330 may be configured to acquire a face image of the second user.

The matching unit 1331 may be configured to match the face image of the second user with the face image corresponding to each photo album.

The first determining unit 1332 may be configured to, when the matching unit 1331 matches the face image of the second user to a photo album, determine the character relationship between the second user and the person being viewed based on the category tag of the matched photo album and the category tag of the target photo album.

Wherein, the first determining unit 1332 may include a first determining component 13321 and a second determining component 13322.

The first determining component 13321 may be configured to determine the character relationship between the first user and the second user based on the category tag of the matched photo album.

The second determining component 13322 may be configured to determine the character relationship between the second user and the person being viewed based on the character relationship between the first user and the person being viewed determined by the first determining submodule 132 and the character relationship between the first user and the second user determined by the first determining component 13321.

According to some embodiments, the photo album based music playing apparatus 700 may further include a sorting module 21.

The sorting module 21 may be configured to sort the pictures in the target photo album in accordance with a chronological order of photographing or storage.

The photo album based music playing apparatus provided in this embodiment may be used to execute the technical solution of the method described in flowchart 300 shown in FIG. 3.

In this embodiment, when the viewer is not only the owner of the device, i.e., the first user, but is determined to also be the second user, the above mentioned face image of the second user may be acquired during the process of recognizing the user identity by taking the face image as the feature information of the user. However, during the process of recognizing the user identity by taking the fingerprint information as the feature information of the user, the fingerprint information may be acquired after the current user is determined to be the second user when the device is triggered to photograph the face image of the second user, such as to photograph using a front camera of the device that also includes a main display screen.

When the viewer actually comprises a plurality of persons viewing a photo album, i.e., corresponding to the above mentioned situation of watching together, the photographed picture for representing the feature information may contain a plurality of face images. In such cases, a face recognition technology such as Adaboost technology may be used to perform a face recognition process, so as to obtain a face image for each of the persons included in the photographed picture.

Then, the acquired face image, or face images, of the second user may be compared and matched with a face image corresponding to each photo album stored on the device by the matching unit 1331. For example, the acquired face images of the second user may be matched to a face image corresponding to a photo album when a similarity measurement of the comparison determines the similarity measurement surpasses a predetermined threshold. During the matching process, feature points, such as the feature points of profile, eyes, nose, mouth and ears, and/or other identifiable feature points of a person's face, of each face image may be extracted from the acquired face image. Then, the similarity measurement may be performed to the feature points of the acquired face image with the feature points of the face image corresponding to each photo album, and when the similarity is greater than a certain threshold, they may be considered to be matched The feature points of the face image corresponding to each photo album may be pre-extracted and stored on a local memory of the device, or stored on an off-site database accessible by the device, and when there the above mentioned matching process is implemented, the feature points of the photographed face image may be obtained from the local memory, or accessed from the database, in real time, or substantially real time. Therefore, the matching processing efficiency is improved.

When the face image of the second user is matched to a certain photo album, this may indicate that a photo album of the second user has also been stored in the device that is owned, or otherwise associated with, the first user. Therefore, the matched photo album also has a category tag set by the first user therefor. Thus the character relationship between the second user and the person being viewed may be determined in combination with the above category tag and the category tag of the target photo album being viewed To be specific, similar to determining the character relationship between the first user and the person being viewed, the character relationship between the first user and the second user may be determined based on the category tag of the matched photo album by the first determining component 13321, and then, the character relationship between the second user and the person being viewed may be determined based on the character relationship between the first user and the person being viewed and the character relationship between the first user and the second user by the second determining component 13322.

For instance, consider the situation where the viewer is user B, and user B is the second user, the first user is user A, and the person being viewed is user C. Wherein, in this situation the category tag set by the first user A for the target photo album corresponding to the person being viewed C is baby, then the character relationship between the first user A and the person being viewed C may be assigned as a parentage relationship. By the face image matching processing, the second user B may be determined to correspond to the photo album with a category tag of friend-Zhang San, then the character relationship between the first user A and the second user B may be determined to be a friend relationship, and thereby the relationship between the second user B and the person being viewed C may be determined to be elder-younger relationship.

In this embodiment, when the viewer is viewing pictures in the target photo album, the pictures may be played in the form of slides. Regarding the playing sequence of the pictures, the sorting module 21 may determine the playing sequence of slides in accordance with a chronological order of photographing, or in accordance with a chronological order of storage of the pictures into the target photo album.

In this embodiment, when the viewer is not the creator of the photo album, e.g., not the owner of the device where the photo album is stored, by collecting the face image of the viewer and matching it with the face image corresponding to each photo album, when the viewer belongs to a certain photo album, the character relationship between the viewer and the person being viewed may be obtained based on the category tag of the matched photo album and the category tag of the target photo album being viewed, with the owner of the device as a medium, and thereby an automatic selecting and playing of music based on the character relationship may be realized.

Figure 8:
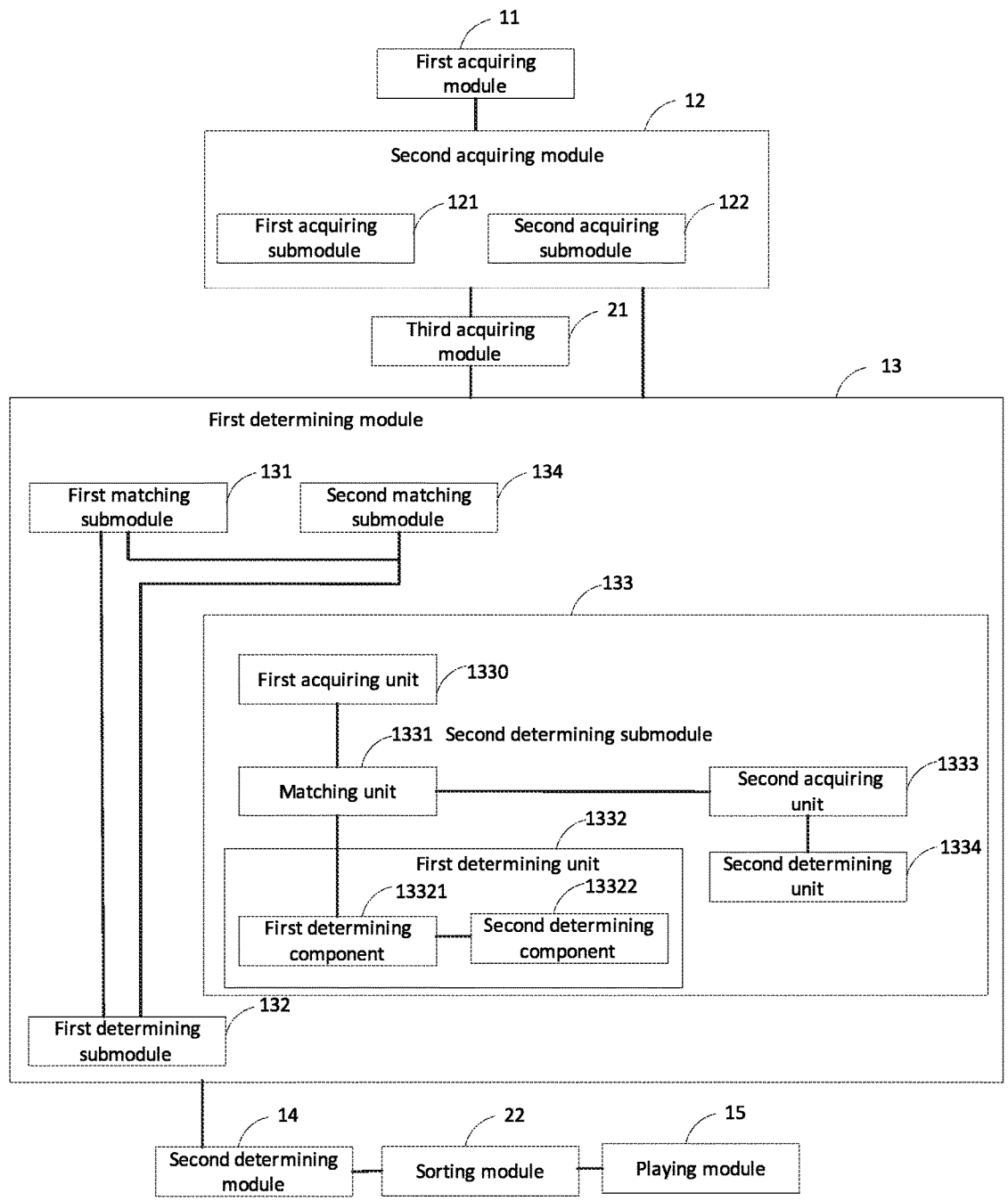
FIG. 8 shows a block diagram showing embodiment four of a photo album based music playing apparatus according to an exemplary embodiment.

FIG. 8 shows a block diagram showing an exemplary embodiment of a photo album based music playing apparatus 800. The apparatus 800 may be configured to implement the method described by flowchart 400. As shown in FIG. 8, apparatus 800 may build upon the components of apparatus 600 shown in FIG. 6, where apparatus 800 includes the second determining submodule 133 that comprises: an acquiring unit 1333 and a second determining unit 1334.

The acquiring unit 1333 may be configured to, when the matching unit fails to match the face image of the second user to a photo album, acquire character feature information of the second user.

The second determining unit 1334 may be configured to determine the character relationship between the second user and the person being viewed based on the character feature information acquired by the acquiring unit and the character relationship between the first user and the person being viewed determined by the first determining submodule The character feature information may include age group feature information and/or gender feature information.

The photo album based music playing apparatus 800 provided in this embodiment can be used to execute the technical solution of the method described in flowchart 400 shown in FIG. 4.

When feature comparison is performed to the face image of the second user with the face image corresponding to each photo album, and no matched photo album is found, the acquiring unit 1333 may extract specific feature points of the face image of the second user to obtain the character feature information of the second user, such as gender and age group.

In this embodiment, a large amount of statistical analysis of the face image may be performed in advance to obtain a correspondence relationship between the feature points and the character feature information of a user (e.g., such as gender and age group).

Assume that the second user is determined to be a female within the age group of 50-60 through the character feature information of the second user, and the character relationship between the first user and the person being viewed determined through the category tag of the target photo album is parentage relationship, then the second determining unit 1334 may determine that the character relationship between the second user and the person being viewed is an elder-younger relationship In an effort to provide an accurate determination of the character relationship, the character feature information, such as gender and age, of the first user may be stored in the device in advance. Thus, the character relationship between the second user and the person being viewed may be determined in combination with the character feature information of the second user, the character feature information of the first user, and the character relationship between the first user and the person being viewed.

In addition or alternatively, the character feature information of the person being viewed, i.e., the face image corresponding to each photo album, may also be pre-stored, thereby the character relationship between the second user and the person being viewed may be determined, by the second determining unit 1324, in combination with the character feature information of the second user, the character feature information of the person being viewed, and the character relationship between the first user and the person being viewed.

For instance, in the case where the second user is determined to be a female within the age group of 20-25 based on the character feature information of the second user, the pre-stored character feature information of the first user may identify the first user is a female aged 23, and the character relationship between the first user and the person being viewed may be determined through the category tag of the target photo album to be a husband-wife relationship. In this case, it may be considered that the character relationship between the second user and the person being viewed is a friend relationship.

For another example, consider the case where the second user is determined to be a female within the age group of 20-25 based on the character feature information of the second user, the pre-stored character feature information of the person being viewed identifies the person being viewed is a female aged 23, and the character relationship between the first user and the person being viewed determined through the category tag of the target photo album to be a husband-wife relationship. In this case, it may be considered that the character relationship between the second user and the person being watched is a friend relationship In this embodiment, when the viewer is not the owner of the device, and the viewer does not belong to a photo album stored in the device, by extracting features of the face image of the viewer, the character relationship between the viewer and the person being viewed may be obtained based on the extracted character feature information and the character relationship between the owner of the device and the person being viewed with the owner of the device as a medium, and thereby an automatic selecting and playing of music based on character relationship may be realized.

Regarding the photo album based music playing apparatus 800 in the above embodiment, the specific manners in which each of the modules and submodules in the apparatus executes the operations have been described in detail in the embodiments concerning the method, and thus will not be illustrated here in detail.

Figure 9:
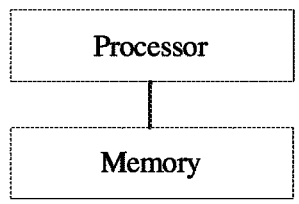
FIG. 9 shows a block diagram showing a device according to an exemplary embodiment.

The above has described the inner functions and structures of the photo album based music playing apparatus 900, as shown in FIG. 9, in practice, the photo album based music playing apparatus 900 may be implemented as a device including a processor and a memory configured to store processor executable instructions. The processor may be configured to acquire a viewing instruction triggered by a user for viewing pictures in a target photo album, acquire feature information of the user, determine a character relationship between the user and a person being viewed corresponding to the pictures in the target photo album based on the feature information of the user, determine a target music type corresponding to the character relationship based on a preset correspondence relationship between each character relationship and each music type, and present the pictures in the target photo album and play music corresponding to the target music type.

In this embodiment, when the user needs to watch pictures in a certain photo album, the character relationship between the user and the face image corresponding to the photo album, i.e., the person being viewed, can be determined based on the feature information of the user, and thereby it is possible to achieve an automatic selecting and playing of music of a corresponding music type based on the character relationship. When a certain photo album is viewed, it is possible to automatically select and play the corresponding music based on the character relationship between the viewer and the person being viewed, which decreases the complexity of operations of the user and increases the user experience.

Figure 10:
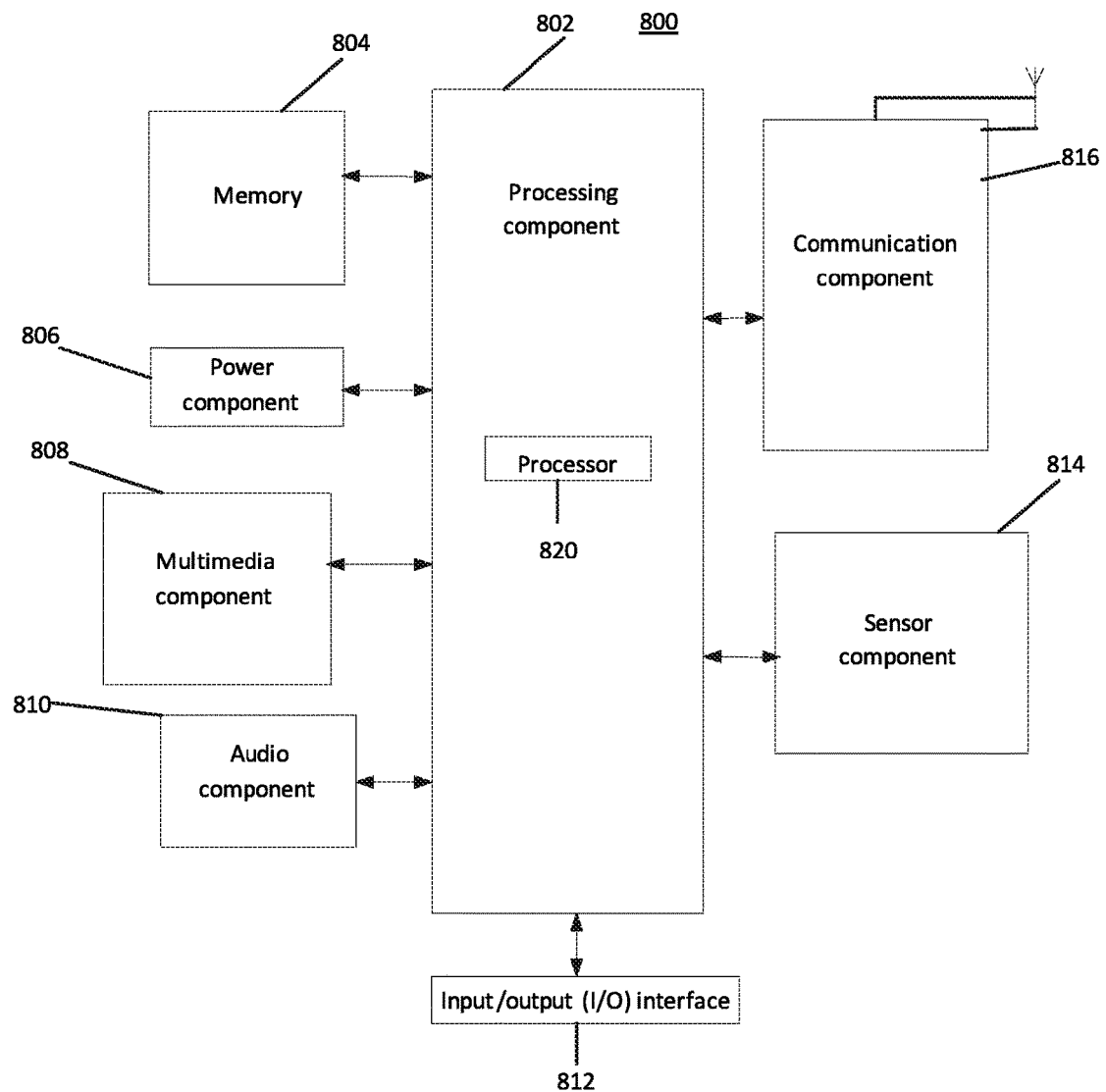
FIG. 10 shows a block diagram showing another device according to an exemplary embodiment.

FIG. 10 shows a block diagram of an exemplary device 1000 according to an exemplary embodiment. For example, the device 1000 may be a mobile phone, a computer, a digital broadcast terminal, a messaging device, a gaming console, a tablet, a medical device, exercise equipment, a personal digital assistant or the like.

Referring to FIG. 10, the device 1000 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 1000, such as the operations associated with display, telephone calls, data communications, camera operations, and recording operations. The processing component 802 may comprise one or more processor 820 to execute instructions to accomplish all of or part of the steps in the above method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 may be configured to store various types of data to support the operation of the device 1000. Examples of such data include instructions for any applications or methods operated on the device 1000, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 1000. The power component 806 may include a power management system, one or more power sources, and any other components associated with the generation, management, and distribution of power in the device 1000.

The multimedia component 808 includes a screen providing an output interface between the device 1000 and the user. In some embodiments, the screen may include a liquid crystal display (LCD) and a touch panel (TP). If the screen includes a touch panel, the screen can be implemented as a touch screen for receiving input signal from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the device 1000 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 1000 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 1812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 1000. For instance, the sensor component 814 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 800, and a change in temperature of the device 1000. The sensor component 814 may include a proximity sensor which is configured to be used for detecting existence of nearby objects when there is no physical contact. The sensor component 814 may also include an optical sensor, such as CMOS or CCD image sensor, to be used in imaging apparatus. In some embodiments, the sensor component 814 may include an acceleration sensor, a gyroscope sensor, a magnetic sensor, a pressure sensor or a temperature sensor.

The communication component 816 is configured to facilitate communication, wired or wirelessly, between the device 1000 and other devices. The device 1000 may access a wireless network based on communication standards, such as WiFi, 2G or 3G or a combination thereof. In one exemplary embodiment, the communication component 816 receives a broadcast signal or broadcast associated information from an external broadcast management system via a broadcast channel. In an exemplary embodiment, the communication component 816 further includes a near field communication (NFC) module to promote short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium comprising instructions, such as included in the memory 804, executable by the processor 820 in the device 1000, for performing the above-described methods. For example, the non-transitory computer-readable storage medium may be a ROM, a random access memory (RAM), a CD-ROM, a magnetic tape, a floppy disc, an optical data storage device, and the like.

When the instructions in the storage medium are executed by the processor of the mobile device, a non-transitory computer readable storage medium enables the mobile device to execute a photo album based music selection method, the method comprising:

acquiring a viewing instruction triggered by a user for watching pictures in a target photo album; acquiring feature information of the user; determining a character relationship between the user and a person being watched corresponding to the pictures in the target photo album based on the feature information of the user; determining a target music type corresponding to the character relationship based on a preset correspondence relationship between each character relationship and each music type; presenting the pictures in the target photo album and playing music corresponding to the target music type.

Other embodiments of the features described herein will be apparent to those skilled in the art from consideration of the specification and practice of the invention disclosed here. This application is intended to cover any variations, uses, or adaptations of the features following the general principles thereof and comprising such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A photo album based music selection method, comprising:
    acquiring a viewing instruction for viewing a target photo album stored on a device, the target photo album including at least one picture;
    acquiring feature information of a user including at least acquiring fingerprint information of the user;
    determining a character relationship between the user and a person represented by image data of a picture included in the target photo album by:
        comparing the fingerprint information with preset fingerprint information of a first user;
        when the fingerprint information is determined to match with the fingerprint information of the first user based on the comparison, determining the user is the first user;
    assigning a first category tag to the target photo album based on the first user; and
    determining the character relationship based on the first category tag assigned to the target photo album;
    determining a target music type corresponding to the character relationship based on a preset correspondence relationship between available character relationships and available music types;
    presenting the at least one picture included in the target photo album; and
    playing music corresponding to the target music type in response to a corresponding picture being presented.

2. The method according to claim 1, wherein determining the character relationship further comprises:
    when the fingerprint information is determined not to match with the fingerprint information of the first user based on the comparison, determining the user is a second user;
    assigning a second category tag to the target photo album based on the second user; and
    determining the character relationship based on the second category tag assigned to the target photo album.

3. The method according to claim 2, further comprising determining a character relationship between the second user and the person represented by the image data of the picture included in the target photo album by:
    acquiring a face image of the second user;
    comparing the face image of the second user with second face images corresponding to persons represented by image data of pictures included in corresponding photo albums stored on the device;
    when the face image of the second user is determined to match the second face images based on the comparison, determining the character relationship between the second user and the person represented by the image data of the picture included in the target photo album based on a category tag of the corresponding photo album that includes the match second face image and the category tag of the target photo album.

4. The method according to claim 1, wherein, acquiring the feature information of the user comprises:
    acquiring a face image of the user;
    determining the character relationship between the user and the person represented by the image data of the picture included in the target photo album based on the feature information of the user by:
        comparing the face image with a preset face image of a first user;
        when the face image is determined to match with the face image of the first user based on the comparison, determining the user is the first user, and determining the character relationship between the first user and the person represented by the image data of the picture included in the target photo album based on a face category tag assigned to the target photo album; and
        when the face image is determined not to match with the face image of the first user based on the comparison, determining the user is a second user.

5. The method according to claim 4, further comprising determining the character relationship between the second user and the person represented by the image data of the picture included in the target photo album by:
    comparing the face image of the second user with the face image corresponding to persons represented by image data of pictures included in corresponding photo albums stored on the device;
    when the face image of the second user is determined to match the second face images based on the comparison, determining the character relationship between the second user and the person represented by the image data of the picture included in the target photo album based on a category tag of the matched photo album and the category tag of the target photo album.

6. The method according to claim 3, wherein, determining the character relationship between the second user and the person represented by the image data of the picture included in the target photo album based on the category tag of the matched photo album and the category tag of the target photo album comprises:
    determining the character relationship between the first user and the second user based on the category tag of the matched photo album; and
    determining the character relationship between the second user and the person represented by the image data of the picture included in the target photo album based on the character relationship between the first user, and the person represented by the image data of the picture included in the target photo album, and the character relationship between the first user and the second user.

7. The method according to claim 5, wherein, determining the character relationship between the second user and the person represented by the image data of the picture included in the target photo album based on the category tag of the matched photo album and the category tag of the target photo album comprises:
   determining the character relationship between the first user and the second user based on the category tag of the matched photo album; and
   determining the character relationship between the second user and the person represented by the image data of the picture included in the target photo album based on the character relationship between the first user and the person represented by the image data of the picture included in the target photo album, and the character relationship between the first user and the second user.

8. The method according to claim 3, further comprising:
   when it is determined that there is no photo album that matches with the face image of the second user, acquiring character feature information of the second user;
   determining the character relationship between the second user and the person represented by the image data of the picture included in the target photo album based on the character feature information and the character relationship between the first user and the person represented by the image data of the picture included in the target photo album, the character feature information comprising age group feature information or gender feature information.

9. The method according to claim 5, further comprising:
   when it is determined that there is no photo album that matches with the face image of the second user, acquiring character feature information of the second user;
   determining the character relationship between the second user and the person represented by the image data of the picture included in the target photo album based on the character feature information and the character relationship between the first user and the person represented by the image data of the picture included in the target photo album, the character feature information comprising age group feature information or gender feature information.

10. The method according to claim 1, further comprising:
    sorting the at least one picture in the target photo album in accordance with a chronological order of photographing or storage.

11. A device, comprising:
    a memory configured to store processor executable instructions;
    a processor in communication with the memory; and
    wherein, the processor is configured to execute the executable instructions to:
       acquire a viewing instruction for viewing a target photo album stored on a device, wherein the target photo album includes at least one picture;
       acquire feature information of a user including at least acquiring fingerprint information of the user;
       determine a character relationship between the user and a person represented by image data of a picture included in the target photo album by:
       comparing the fingerprint information with preset fingerprint information of a first user;
       when the fingerprint information is determined to match the fingerprint information of the first user based on the comparison, determining the user is the first user;
       assigning a first category tag to the target photo album based on the first user; and
       determining the character relationship based on the first category tag assigned to the target photo album;
       determine a target music type corresponding to the character relationship based on a preset correspondence relationship between available character relationships and available music types;
       present the at least one picture included in the target photo album; and
       play music corresponding to the target music type in response to a corresponding picture being presented.

12. The device according to claim 11, wherein, the processor is configured to execute the executable instructions to determine the character relationship by further:
    when the fingerprint information is determined not to match with the fingerprint information of the first user based on the comparison, determining the user is a second user;
    assigning a second category tag to the target photo album based on the second user; and
    determining the character relationship based on the second category tag assigned to the target photo album.

13. The device according to claim 12, wherein, the processor is also configured to execute the executable instructions to:
    acquire a face image of the second user;
    compare the face image of the second user with second face images corresponding to persons represented by image data of pictures included in corresponding photo albums stored on the device;
    when the face image of the second user is determined to match the second face images based on the comparison, determine the character relationship between the second user and the person represented by the image data of the picture included in the target photo album based on a category tag of the corresponding photo album that includes the match second face image and the category tag of the target photo album.

14. The device according to claim 11, wherein, the processor is also configured to execute the executable instructions to:
    acquire a face image of the user;
    determine the character relationship between the user and the person represented by the image data of the picture included in the target photo album based on the feature information of the user by:
    compare the face image with a preset face image of a first user;
    when the face image is determined to match with the face image of the first user based on the comparison, determine the user is the first user, and determining the character relationship between the first user and the person represented by the image data of the picture included in the target photo album based on a face category tag assigned to the target photo album; and
    when the face image is determined not to match with the face image of the first user based on the comparison, determine the user is a second user.

15. The device according to claim 14, wherein, the processor is also configured to execute the executable instructions to:
    comparing the face image of the second user with the face image corresponding to persons represented by image data of pictures included in corresponding photo albums stored on the device;
    when the face image of the second user is determined to match the second face images based on the comparison, determining the character relationship between the second user and the person represented by the image data of the picture included in the target photo album based on a category tag of the matched photo album and the category tag of the target photo album.

16. The device according to claim 13, wherein, the processor is also configured to execute the executable instructions to:
 determine the character relationship between the first user and the second user based on the category tag of the matched photo album; and
 determine the character relationship between the second user and the person represented by the image data of the picture included in the target photo album based on the character relationship between the first user, and the person represented by the image data of the picture included in the target photo album, and the character relationship between the first user and the second user.

17. The device according to claim 15, wherein, the processor is also configured to execute the executable instructions to:
 determine the character relationship between the first user and the second user based on the category tag of the matched photo album; and
 determine the character relationship between the second user and the person represented by the image data of the picture included in the target photo album based on the character relationship between the first user and the person represented by the image data of the picture included in the target photo album, and the character relationship between the first user and the second user.

18. The device according to claim 13, wherein, the processor is also configured to execute the executable instructions to:
 when it is determined that there is no photo album that matches with the face image of the second user, acquire character feature information of the second user;
 determine the character relationship between the second user and the person represented by the image data of the picture included in the target photo album based on the character feature information and the character relationship between the first user and the person represented by the image data of the picture included in the target photo album, the character feature information comprising age group feature information or gender feature information.

19. The device according to claim 15, wherein, the processor is also configured to execute the executable instructions to:
 when it is determined that there is no photo album that matches with the face image of the second user, acquire character feature information of the second user;
 determine the character relationship between the second user and the person represented by the image data of the picture included in the target photo album based on the character feature information and the character relationship between the first user and the person represented by the image data of the picture included in the target photo album, the character feature information comprising age group feature information or gender feature information.

20. A non-transitory computer-readable storage medium having stored therein instructions that, when executed by a processor of a mobile device, causes the mobile device to perform a photo album based music selection method, the method comprising:
 acquiring a viewing instruction for viewing a target photo album stored on a device, the target photo album including at least one picture;
 acquiring feature information of a user including at least acquiring fingerprint information of the user;
 determining a character relationship between the user and a person represented by image data of a picture included in the target photo album by:
 comparing the fingerprint information with preset fingerprint information of a first user;
 when the fingerprint information is determined to match with the fingerprint information of the first user based on the comparison, determining the user is the first user;
 assigning a first category tag to the target photo album based on the first user; and
 determining the character relationship based on the first category tag assigned to the target photo album;
 determining a target music type corresponding to the character relationship based on a preset correspondence relationship between available character relationships and available music types;
 presenting the at least one picture included in the target photo album; and
 playing music corresponding to the target music type in response to a corresponding picture being presented.

* * * * *